(12) United States Patent
Xiong et al.

(10) Patent No.: US 12,720,484 B2
(45) Date of Patent: Aug. 25, 2026

(54) METHOD FOR RECOGNIZING AWAY-FROM-HOME SCENARIO OR BACK-HOME SCENARIO, AND DEVICE

(71) Applicant: Huawei Technologies Co., Ltd., Shenzhen (CN)

(72) Inventors: Jiali Xiong, Wuhan (CN); Shuaiqi Gan, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 18/699,429

(22) PCT Filed: Sep. 8, 2022

(86) PCT No.: PCT/CN2022/117931
§ 371 (c)(1),
(2) Date: Apr. 8, 2024

(87) PCT Pub. No.: WO2023/071549
PCT Pub. Date: May 4, 2023

(65) Prior Publication Data

US 2026/0136330 A1 May 14, 2026

(30) Foreign Application Priority Data

Oct. 29, 2021 (CN) ........................ 202111275153.3

(51) Int. Cl.

| | |
|---|---|
| ***H04W 64/00*** | (2009.01) |
| ***H04W 76/19*** | (2018.01) |
| *H04W 84/12* | (2009.01) |

(52) U.S. Cl.
CPC ......... *H04W 64/006* (2013.01); *H04W 76/19* (2018.02); *H04W 84/12* (2013.01)

(58) Field of Classification Search
None
See application file for complete search history.

(56) References Cited

U.S. PATENT DOCUMENTS 10,075,334 B1 * 9/2018 Kozura ............... H04W 12/086
10,397,013 B1 * 8/2019 Hill ....................... H04L 12/281
(Continued)

FOREIGN PATENT DOCUMENTS

CN 104883734 A 9/2015
CN 107453962 A 12/2017
(Continued)

*Primary Examiner* — Anh Vu H Ly
(74) *Attorney, Agent, or Firm* — Conley Rose, P.C.

(57) ABSTRACT

A method for recognizing an away-from-home scenario or a back-home scenario is applied to a routing device. The routing device is connected to a plurality of electronic devices. In the method, the routing device is used, and a portable electronic device is used as a control device, to perform detection on a behavior of the control device being connected to Wi-Fi. Then, when the control device breaks a Wi-Fi connection and re-establishes the Wi-Fi connection, whether a scenario in which the control device breaks a communication connection is an away-from-home scenario and whether a scenario in which the control device re-establishes the communication connection is a back-home scenario are recognized based on an offline manner of the control device.

20 Claims, 6 Drawing Sheets

(56) References Cited

U.S. PATENT DOCUMENTS

| | | | | |
|---|---|---|---|---|
| 2019/0158304 | A1* | 5/2019 | Sundermeyer ...... | H04L 12/2818 |
| 2019/0158353 | A1* | 5/2019 | Johnson .............. | H04L 63/0823 |
| 2022/0208319 | A1* | 6/2022 | Ansari ................ | H04L 12/2829 |

FOREIGN PATENT DOCUMENTS

| | | | |
|---|---|---|---|
| CN | 109474494 | A | 3/2019 |
| WO | 2017087285 | A1 | 5/2017 |

* cited by examiner

METHOD FOR RECOGNIZING AWAY-FROM-HOME SCENARIO OR BACK-HOME SCENARIO, AND DEVICE

CROSS-REFERENCE TO RELATED APPLICATION

This application is a U.S. National Stage of International Patent Application No. PCT/CN2022/117931 filed on Sep. 8, 2022, which claims priority to Chinese Patent Application No. 202111275153.3 filed on Oct. 29, 2021, both of which are hereby incorporated by reference.

TECHNICAL FIELD

This application relates to the field of terminal technologies, and in particular, to a method for recognizing an away-from-home scenario or a back-home scenario, and a device.

BACKGROUND

With the development of economy and the progress of science and technology, people's consumption concepts and life philosophy change gradually. To better meet people's requirements for life of quality, development gradually proceeds from a single smart device to an all-scenario smart home. Therefore, how to recognize a scenario in which a user gets away from home or a scenario in which the user gets back home is a technical problem to be resolved.

Currently, the scenario in which the user gets away from home or the scenario in which the user gets back home is mainly recognized by using a smart door lock or a smart camera. A smart door lock is used as an example. When the user gets away from home and closes a door, a smart door lock on the door may recognize that the user is to get away from home. In this case, a smart home at home may enter an away-from-home mode. For example, a light, a water heater, an air conditioner, or the like at home may be turned off. When the user gets back home, for example, when the smart door lock is opened, the smart door lock may recognize that the user is to get back home. In this case, the light, a television, the water heater, or the like at home may be turned on. This implements whole-home intelligence and brings great convenience to the user. However, the foregoing processes depend on the smart door lock or the smart camera. If no smart door lock or smart camera is installed at home, the scenario in which the user gets away from home or the scenario in which the user gets back home cannot be recognized.

SUMMARY

This application provides a method for recognizing an away-from-home scenario or a back-home scenario, and a device, to resolve a problem in which scenario recognition depends on a smart door lock or a smart camera, and consequently the scenario recognition cannot be performed when no corresponding device is installed. In this way, scenario recognition accuracy is improved, and user experience is improved.

According to a first aspect, this application provides a method for recognizing an away-from-home scenario or a back-home scenario. The method may be applied to a routing device. The routing device is connected to a plurality of electronic devices. The method includes: First, when detecting that a control device breaks a communication connection to the routing device, the routing device determines an offline manner of the control device. The control device is one of the plurality of electronic devices, and the control device is a portable electronic device. Then, the routing device recognizes, based on the offline manner of the control device, whether a scenario in which the control device breaks the communication connection is the away-from-home scenario. When detecting that the control device re-establishes the communication connection to the routing device, the routing device recognizes, based on the offline manner of the control device, whether a scenario in which the control device re-establishes the communication connection is the back-home scenario.

According to the foregoing technical solution, a routing device commonly used in a family can be used, and a portable electronic device can be used as a control device. Detection is performed on a behavior of the control device being connected to the routing device, to determine a scenario in which a user gets away from home or a scenario in which the user gets back home. In addition, an offline manner of the control device is determined, and the scenario is determined based on the offline manner when the control device goes online again. In this way, scenario recognition accuracy can be improved, and user experience can be improved. In the solution of this application, the scenario in which the user gets away from home or the scenario in which the user gets back home can be recognized without a smart door lock or a smart camera.

In a possible implementation, that the routing device determines an offline manner of the control device includes:

If the routing device detects a modification operation performed by a user on a wireless fidelity Wi-Fi parameter, the routing device determines that the offline manner of the control device is a first offline manner. If the routing device receives a preset packet sent by the control device, the routing device determines that the offline manner of the control device is a second offline manner. If the routing device does not receive the preset packet sent by the control device and/or does not detect the modification operation performed by the user on the wireless fidelity Wi-Fi parameter, the routing device determines that the offline manner of the control device is a third offline manner; or if the routing device determines that a change in signal strength and a change in a quantity of sent packets within a preset time before the control device breaks the communication connection to the routing device conform to a specified rule, the routing device determines that the offline manner of the control device is the third offline manner.

According to the foregoing technical solutions, the routing device may recognize the offline manner of the control device, and determine the scenario in which the user gets away from home or the scenario in which the user gets back home based on the offline manner. In this way, scenario recognition accuracy can be improved.

In a possible implementation, that the routing device recognizes, based on the offline manner of the control device, whether a scenario in which the control device breaks the communication connection is an away-from-home scenario includes:

If the routing device determines that the offline manner of the control device is the first offline manner or the second offline manner, the routing device determines that the scenario in which the control device breaks the communication connection is a non-away-from-home scenario. If the routing device determines that the offline manner of the control device is the third offline manner, the routing device determines that the scenario in which the control device breaks the communication connection is the away-from-home scenario.

According to the foregoing technical solutions, when the control device is offline, it may be determined whether the control device is in the away-from-home scenario. When the offline manner of the control device is the third offline manner, it may be determined that a scenario in which the control device is offline is a scenario in which the user gets away from home. It should be understood that the third offline manner is an aging offline manner in the following embodiments.

In a possible implementation, that the routing device recognizes, based on the offline manner of the control device, whether a scenario in which the control device re-establishes the communication connection is a back-home scenario includes:

If the routing device determines that the offline manner of the control device is the first offline manner, the routing device determines that the scenario in which the control device re-establishes the communication connection is a non-back-home scenario. If the routing device determines that the offline manner of the control device is the second offline manner, the routing device determines based on a first received signal strength RSSI and a second RSSI, the scenario in which the control device re-establishes the communication connection. The first RSSI is an RSSI obtained when the control device breaks the communication connection to the routing device, and the second RSSI is an RSSI obtained when the control device re-establishes the communication connection to the routing device. If the routing device determines that the offline manner of the control device is the third offline manner, the routing device determines that the scenario in which the control device re-establishes the communication connection is the back-home scenario.

According to the foregoing technical solutions, when the control device goes online again, it may be determined based on the offline manner whether a scenario in which the control device goes online is the back-home scenario. In this way, back-home scenario determining accuracy can be improved.

In a possible implementation, that the routing device determines based on a first received signal strength RSSI and a second RSSI, the scenario in which the control device re-establishes the communication connection includes.

If the routing device determines that a difference between the first RSSI and the second RSSI is greater than a specified threshold, the routing device determines that the scenario in which the control device re-establishes the communication connection is the back-home scenario. If the routing device determines that the difference between the first RSSI and the second RSSI is less than the specified threshold, the routing device determines that the scenario in which the control device re-establishes the communication connection is the non-back-home scenario.

According to the foregoing technical solutions, a difference between an RSSI existing when the control device goes online and an RSSI existing when the control device goes offline is compared with a specified threshold to further determine an online scenario. In this way, back-home scenario recognition accuracy can be improved.

In a possible implementation, the routing device includes a router. Certainly, the routing device in this application may further include another device. This is not limited in this application.

According to a second aspect, this application provides a routing device. The routing device includes one or more processors, one or more memories, and one or more computer programs.

The one or more computer programs are stored in the one or more memories, the one or more computer programs include instructions, and when the instructions are invoked and executed by the one or more processors, the device is enabled to perform the method according to any one of the first aspect and the possible designs of the first aspect. For example, when the instructions are invoked and executed by the one or more processors, the device is enabled to perform the following steps:

when it is detected that a control device breaks a communication connection to the device, determining an offline manner of the control device, where the control device is one of a plurality of electronic devices, and the control device is a portable electronic device; recognizing, based on the offline manner of the control device, whether a scenario in which the control device breaks the communication connection is an away-from-home scenario; and when it is detected that the control device re-establishes the communication connection to the routing device, recognizing, based on the offline manner of the control device, whether a scenario in which the control device re-establishes the communication connection is a back-home scenario.

According to a third aspect, this application further provides a computer-readable storage medium. The computer-readable storage medium stores instructions, and when the instructions are run on a routing device, the routing device is enabled to perform the method according to any one of the first aspect and the possible designs of the first aspect.

According to a fourth aspect, this application further provides a computer program product. When the computer program product is run on a routing device, the routing device is enabled to perform the method according to any one of the first aspect and the possible designs of the first aspect of embodiments in this application.

For the foregoing aspects of the second aspect to the fourth aspect and technical effects that can be achieved in the foregoing aspects, refer to descriptions of the technical effects that can be achieved in the foregoing possible solutions of the first aspect. Details are not described herein again.

DESCRIPTION OF EMBODIMENTS

Figure 1:
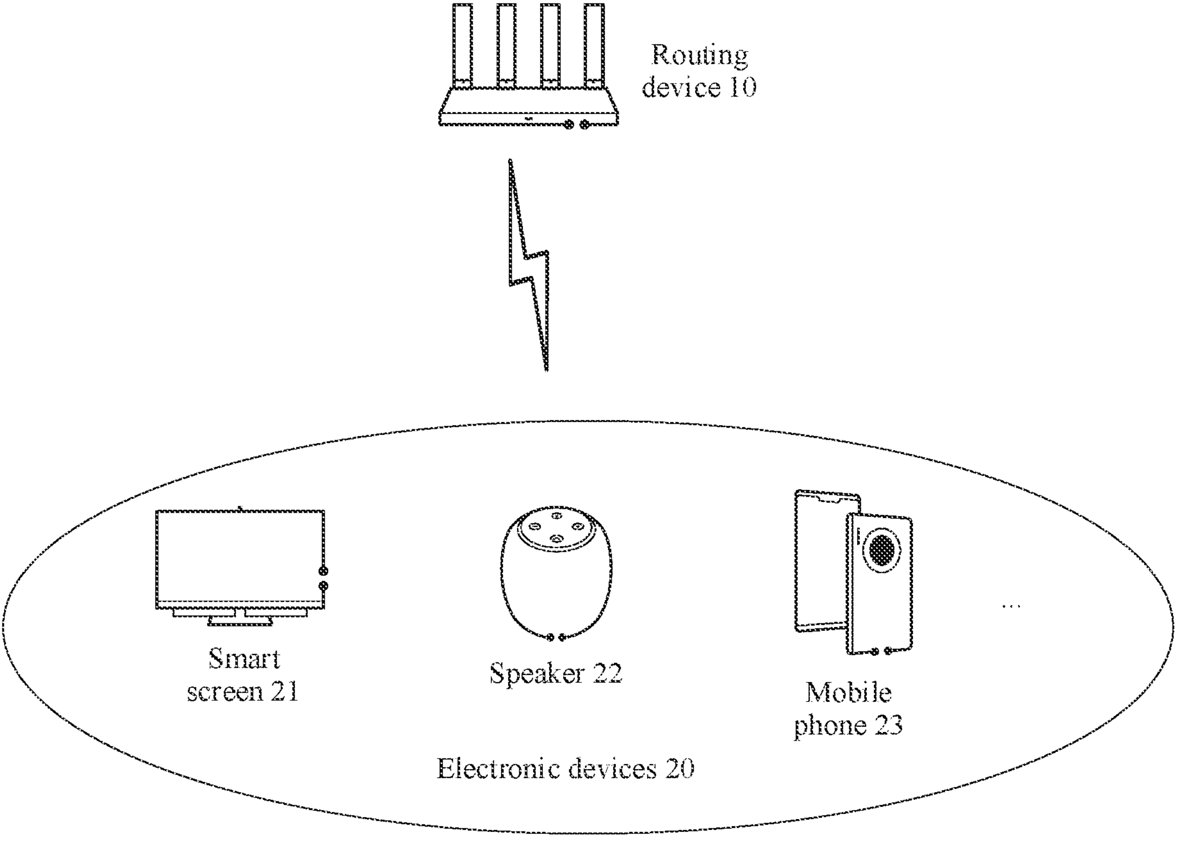
FIG. 1 is a schematic diagram of an application scenario according to an embodiment of this application.

Terms used in the following embodiments are only intended to describe specific embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly. It should be further understood that in the following embodiments of this application, "at least one" and "one or more" mean one, two, or more (including two). The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "comprise", and "have", and variants thereof all mean "include but are not limited to", unless otherwise specifically emphasized in another manner. The term "connection" includes a direct connection and an indirect connection, unless otherwise stated.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a relative concept in a specific manner.

Currently, emergence of a smart home brings great convenience to life of a user. However, the current convenience of the smart home depends on a smart door lock or a smart camera to recognize a scenario in which the user gets away from home or a scenario in which the user gets back home. For example, when the user gets away from home and closes a door, the smart door lock may detect that the user is to get away from home. In this case, the smart door lock may check whether the door and a window of home are closed properly, and output a reminder message. In addition, an electrical appliance, such as a television, an air conditioner, or a water heater, that does not need to work when the user gets away from home, a light that is turned on, and the like may be turned off. When the user opens the smart door lock and gets back home, the smart door lock may detect that the user gets back home. In this case, the light, the air conditioner, the water heater, and the like at home may be turned on. This can bring convenience when the user gets away from home or gets back home. However, if no smart door lock or smart camera is installed at home, the scenario in which the user gets away from home or the scenario in which the user gets back home cannot be recognized.

In view of this, in embodiments of this application, a routing device (for example, a router) and a mobile phone that are commonly used in a family are used to recognize the scenario in which the user gets away from home or the scenario in which the user gets back home, to enable a corresponding mode for a smart home at home in a corresponding scenario. Specifically, the routing device may perform detection on a behavior of the mobile phone being connected to wireless fidelity (wireless fidelity, Wi-Fi), to recognize whether the user is in an away-from-home scenario or a back-home scenario. That is, the scenario in which the user gets away from home or the scenario in which the user gets back home can be recognized without depending on the smart door lock or the smart camera. In this way, user experience can be improved.

The following first describes an application scenario in embodiments of this application. As shown in FIG. 1, the application scenario may include a routing device 10 and at least one electronic device 20, for example, a smart screen 21, a speaker 22, and a mobile phone 23 shown in the figure. The routing device 10 may be interconnected to the at least one electronic device 20 through a communication network. For example, the communication network may be a local area network, such as a wireless fidelity (wireless fidelity, Wi-Fi) hot spot network. The at least one electronic device may be connected to a same routing device through the communication network. It should be understood that, in FIG. 1, only three electronic devices are used as an example for description. A quantity of electronic devices is not specifically limited in this embodiment of this application. In addition, the electronic device may be an operating system such as iOS®, Android®, Microsoft®, or Harmony OS®. This is not limited herein. It should be understood that FIG. 1 is merely an example. In actual application, there may also be a plurality of routing devices at user's home, or more electronic devices may be included.

It should be noted that, in this application, a routing device used to recognize a scenario in which the user gets away from home or a scenario in which the user gets back home may include a router, for example, a customer premise equipment (customer premise equipment, CPE). This is not limited in this application.

The mobile phone 23 is almost an electronic device carried by the user, and the smart screen 21 and the speaker 22 are non-portable electronic devices at home. Therefore, in this embodiment of this application, a behavior of a portable electronic device, for example, the mobile phone, being connected to Wi-Fi, may be used to recognize the scenario in which the user gets away from home or the scenario in which the user gets back home. For example, when the mobile phone disconnects from Wi-Fi, the routing device may recognize that the user is in an away-from-home scenario; and when the mobile phone switches from disconnecting from Wi-Fi to connecting to Wi-Fi, the routing device may recognize that the user is in a back-home scenario.

Figure 2:
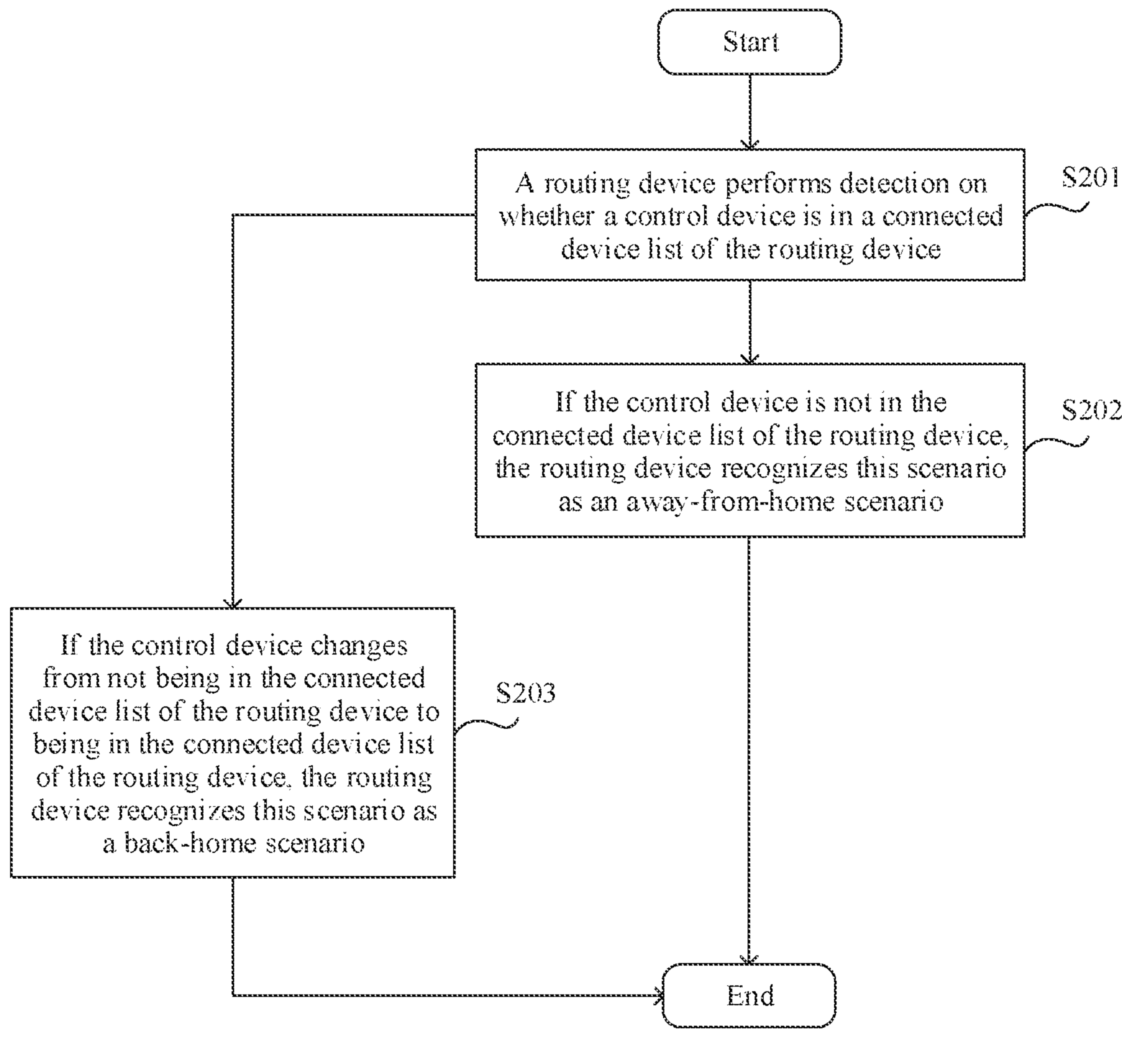
FIG. 2 is a flowchart of a method for recognizing an away-from-home scenario or a back-home scenario according to an embodiment of this application.

FIG. 2 is a flowchart of a method for recognizing an away-from-home scenario or a back-home scenario according to an embodiment of this application. As shown in FIG. 2, the method may include the following steps.

S201: A routing device performs detection on whether a control device is in a connected device list of the routing device.

Considering that there is generally at least one mobile phone in a family, one mobile phone may be set as the control device. The routing device only needs to perform detection on a behavior of the control device being connected to Wi-Fi, to recognize a scenario in which a user gets away from home or a scenario in which the user gets back home. The control device may be set by the user based on an actual application scenario, or may be set by the routing device. This is not limited in this application.

For example, it is assumed that the application scenario is a scenario in which the user lives alone, and the user has only one mobile phone. In this case, the routing device may use the single mobile phone as the control device, or the user sets the mobile phone as the control device. Then, the routing device performs detection on whether the mobile phone is connected to Wi-Fi. For another example, it is assumed that the application scenario is the scenario in which the user lives alone, and the user has a plurality of mobile phones. In this case, the routing device may select any one of the plurality of mobile phones as the control device, or the user sets one frequently-used mobile phone among the plurality of mobile phones as the control device.

It should be noted that the control device may be changed based on the actual application scenario. This is not specifically limited in this application. For example, a user A may set a mobile phone of the user A as the control device. If parents of the user A come to home of the user A, and the parents are at home when the user A goes out to work, a smart home at home may not need to enter an away-from-home mode. To be specific, a television, an air conditioner, or the like at home does not need to be turned off. In this case, the user A may change the control device to a mobile phone of the mother or a mobile phone of the father.

In some embodiments, after an electronic device is connected to Wi-Fi, the electronic device may be displayed in the connected device list of the routing device. That is, whether the control device is connected to Wi-Fi of the routing device can be determined by determining whether the control device is in the connected device list.

S202: If the control device is not in the connected device list of the routing device, the routing device recognizes the scenario as the away-from-home scenario.

S203: If the control device changes from not being in the connected device list of the routing device to being in the connected device list of the routing device, the routing device recognizes the scenario as the back-home scenario.

In some embodiments, if the control device is not in the connected device list of the routing device, it may be understood that the control device is not connected to Wi-Fi. In this case, it may be considered that the user gets away from home. If the control device changes from not being in the connected device list of the routing device to being in the connected device list of the routing device, it may be understood that the control device switches from not being connected to Wi-Fi to being connected to Wi-Fi. In this case, it may be considered that the user gets back home.

According to the foregoing embodiments, the scenario in which the user gets away from home or the scenario in which the user gets back home can be recognized without a need to install a smart door lock or a smart camera at user's home. Then, a smart home at home is set to a corresponding away-from-home mode or a corresponding back-home mode, to improve user experience.

Further, there are various manners in which the user accesses the Internet. Therefore, if the user does not connect to Wi-Fi but uses, for example, mobile data to implement an Internet access function, it may not be accurate enough to determine the away-from-home scenario or the back-home scenario only based on whether the user connects to Wi-Fi. Alternatively, when the user already gets away from home, for example, waits for an elevator at an entrance of home, the mobile phone is still not disconnected from Wi-Fi. Only when the user has been away from home for several minutes and the mobile phone is relatively distant from the routing device, the mobile phone is disconnected from Wi-Fi. In this case, determining only based on whether the mobile phone is connected to Wi-Fi may cause a scenario in which the user waits for the elevator at the entrance of home to be determined as a non-away-from-home scenario. Alternatively, in a case, for example, in which Wi-Fi is disconnected due to an accidental touch of the user, or the like, and Wi-Fi is reconnected, a smart device at home may be turned on or off unnecessarily, which affects normal use of the user and results in poor user experience.

In view of this, in this embodiment of this application, to avoid incorrectly determining a scenario, the routing device may mark an offline manner of the control device. Then, when the control device goes online again, the routing device may determine, based on the mark of the offline manner, the scenario in which the user gets away from home or the scenario in which the user gets back home.

In some embodiments, there may be the following several cases in which the electronic device goes offline, that is, breaks a Wi-Fi connection.

Case 1: The user modifies a Wi-Fi parameter (for example, a password or a name), causing the routing device to kick off the electronic device.

Case 2: The electronic device may send a deauthentication/disassociation (deauth/disassoc) packet to the routing device.

In a possible implementation, the electronic device is in a screen-off state, and may break the Wi-Fi connection after the electronic device is in the screen-off state for a period of time. In this case, the electronic device may send the deauth/disassoc packet to the routing device. Alternatively, the user actively turns off a Wi-Fi switch on the electronic device. In this case, the routing device also receives the deauth/disassoc packet sent by the electronic device.

Case 3: The electronic device is moved away from the routing device until the electronic device breaks the Wi-Fi connection.

In Case 3, when the electronic device is moved away from the routing device until the electronic device breaks the Wi-Fi connection, the electronic device does not send the deauth/disassoc packet to the routing device. In other words, the routing device cannot receive the deauth/disassoc packet sent by the electronic device.

It should be understood that the foregoing several offline manners are merely examples for description, and another offline manner may also be included. This is not limited in this application.

Optionally, the routing device may mark the electronic device based on different offline manners. For example, in a case in which the electronic device breaks the Wi-Fi connection because the routing device kicks off the device, the electronic device may be marked as a router-kicked-off device. In a case in which the electronic device breaks the Wi-Fi connection because the electronic device is in a screen-off and sleep state, the electronic device may be marked as active offline. In a case in which the electronic device breaks the Wi-Fi connection because the electronic device is moved away from the routing device until the electronic device breaks the Wi-Fi connection, the electronic device may be marked as aging offline. Certainly, the electronic device may alternatively be marked as A, B, C, or the like. This is not limited in this application.

In a possible implementation, if the routing device does not receive the deauth/disassoc packet sent by the electronic device, it may be determined that an offline manner of the electronic device is a non-active offline manner. On this basis, to improve scenario detection precision, the routing device may perform detection on a change in signal strength of the electronic device and a change in a quantity of sent packets of the electronic device, and determine, based on a change in the signal strength of the electronic device and a change in the quantity of sent packets of the electronic device within a preset time before the electronic device goes offline (for example, two minutes before the electronic device goes offline), the electronic device as aging offline. In this way, when the electronic device goes online, whether a scenario in which the electronic device goes online is the scenario in which the user gets back home may be determined based on an aging offline mark.

Figure 3:
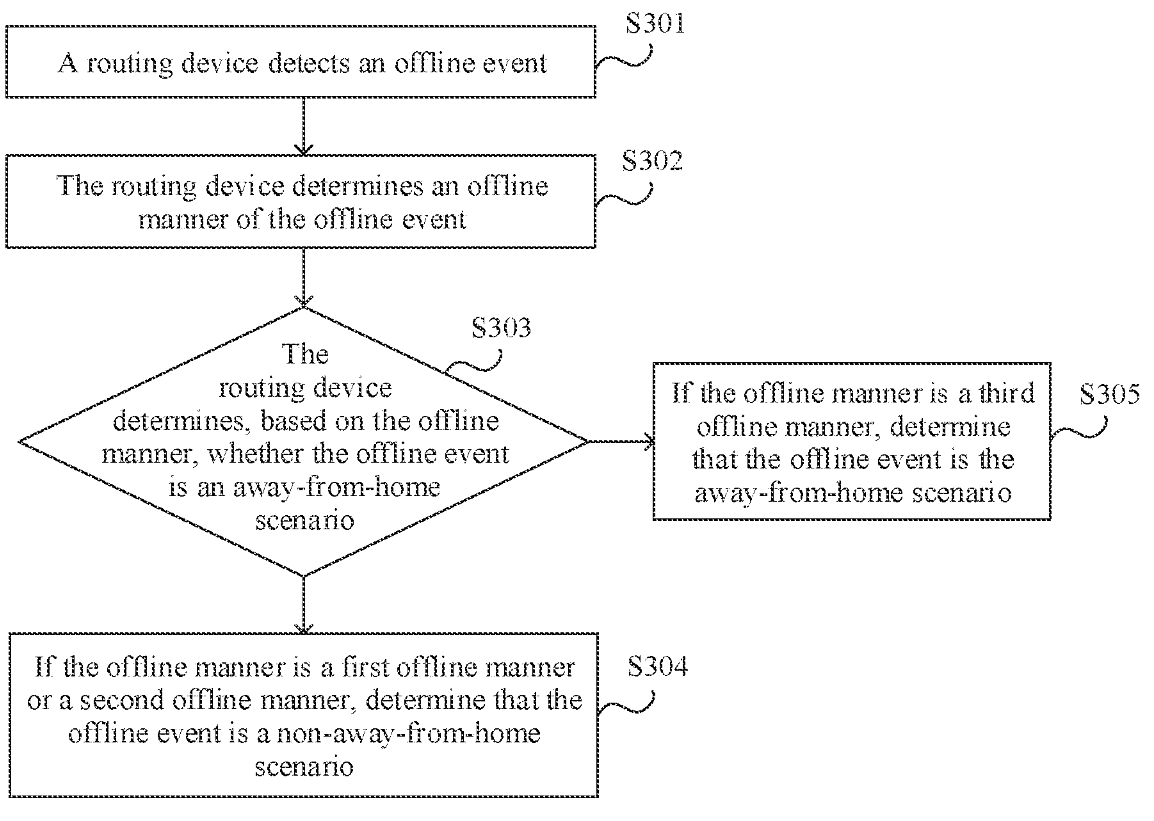
FIG. 3 is a flowchart of a method for recognizing an away-from-home scenario according to an embodiment of this application.

For example, FIG. 3 is a flowchart of a method for recognizing an away-from-home scenario according to an embodiment of this application. As shown in FIG. 3, the method may include the following steps.

S301: A routing device detects an offline event.

S302: The routing device determines an offline manner of the offline event.

In some embodiments, if the routing device detects a modification operation performed by a user on a Wi-Fi parameter and consequently a control device cannot access the routing device, and the routing device kicks off the control device, causing the control device to break a Wi-Fi connection, it may be determined that an offline manner of the control device is router-kicked-off offline. If the routing device detects that the control device sends a deauth/disassoc packet to the routing device, it may be determined that the offline manner of the control device is active offline. If the routing device does not receive the deauth/disassoc packet sent by the control device and does not detect the modification operation performed by the user on the Wi-Fi parameter, it is determined that the offline manner of the control device is aging offline. If the routing device detects that a change in signal strength of the control device and a quantity of sent packets of the control device within a preset time meets a specified rule, it is determined that the offline manner of the control device is aging offline.

Optionally, when receiving the deauth/disassoc packet sent by the control device, the routing device may obtain a received signal strength indication (received signal strength indication, RSSI) existing when the control device goes offline, so that the RSSI is subsequently compared with an RSSI existing when the control device goes online, to determine whether the online event is a back-home scenario.

S303: The routing device determines, based on the offline manner, whether the offline event is an away-from-home scenario.

S304: If the offline manner is a first offline manner or a second offline manner, determine that the offline event is a non-away-from-home scenario.

S305: If the offline manner is a third offline manner, determine that the offline event is the away-from-home scenario.

For ease of description, the manner of going offline because the router kicks off the device may be denoted as the "first offline manner", the active offline manner may be denoted as the "second offline manner", and the aging offline manner may be denoted as the "third offline manner". That is, if the routing device determines that the offline manner of the control device is router-kicked-off or active offline, it is determined that the offline event is the non-away-from-home scenario; or if the offline manner of the control device is aging offline, it is determined that the offline event is the away-from-home scenario.

Figure 4:
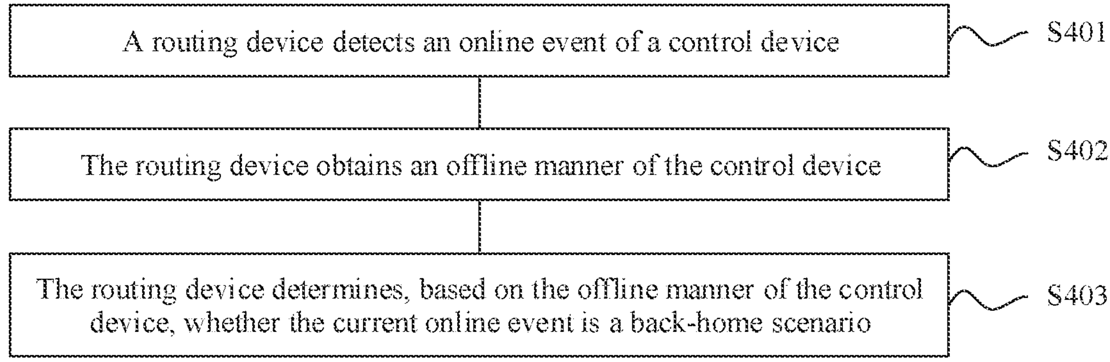
FIG. 4 is a flowchart of a method for recognizing a back-home scenario according to an embodiment of this application.

For example, FIG. 4 is a flowchart of a method for recognizing a back-home scenario according to an embodiment of this application. As shown in FIG. 4, the method may include the following steps.

S401: A routing device detects an online event of a control device.

In some embodiments, when detecting that the control device goes online, that is, the control device is from not being connected to Wi-Fi to being connected to Wi-Fi, the routing device may obtain an RSSI existing when the control device goes online.

S402: The routing device obtains an offline manner of the control device.

In a possible implementation, after detecting an offline event, the routing device may determine an offline manner corresponding to the offline event, and then the routing device may record an offline manner of an electronic device, for example, may record the offline manner in the following Table 1.

TABLE 1

| Electronic device | Offline manner |
|---|---|
| Electronic device 1 | Active offline |
| Electronic device 2 | Aging offline |
| Electronic device 3 | Router-kicked off |
| Electronic device 4 | Active offline |

It should be understood that the electronic device in Table 1 is an example of an electronic device connected to the routing device, and different electronic devices may have different offline manners or may have a same offline manner. Certainly, the table may further include an offline time, an online time, and the like of the electronic device. This is not limited in this application.

Optionally, the routing device may update the foregoing Table 1 based on a behavior of the electronic device going online or offline (including a behavior of the device going online or offline due to restart of the routing device or modification of a Wi-Fi parameter). In addition, the offline manner recorded in Table 1 may be a manner in which the electronic device goes offline last time, or a manner in which the electronic device goes offline for a plurality of times may be recorded.

S403: The routing device determines, based on the offline manner of the control device, whether the current online event is the back-home scenario.

In this application, S403 is described by using the foregoing three offline manners as an example. The offline manner of the control device is one of the foregoing three offline manners. Therefore, when the control device goes online again, the routing device needs to obtain a manner in which the control device goes offline last time, namely, an offline manner corresponding to an offline time closest to a current time, and then determines whether a scenario is a back-home scenario based on the manner of the control device going offline last time.

Figure 5:
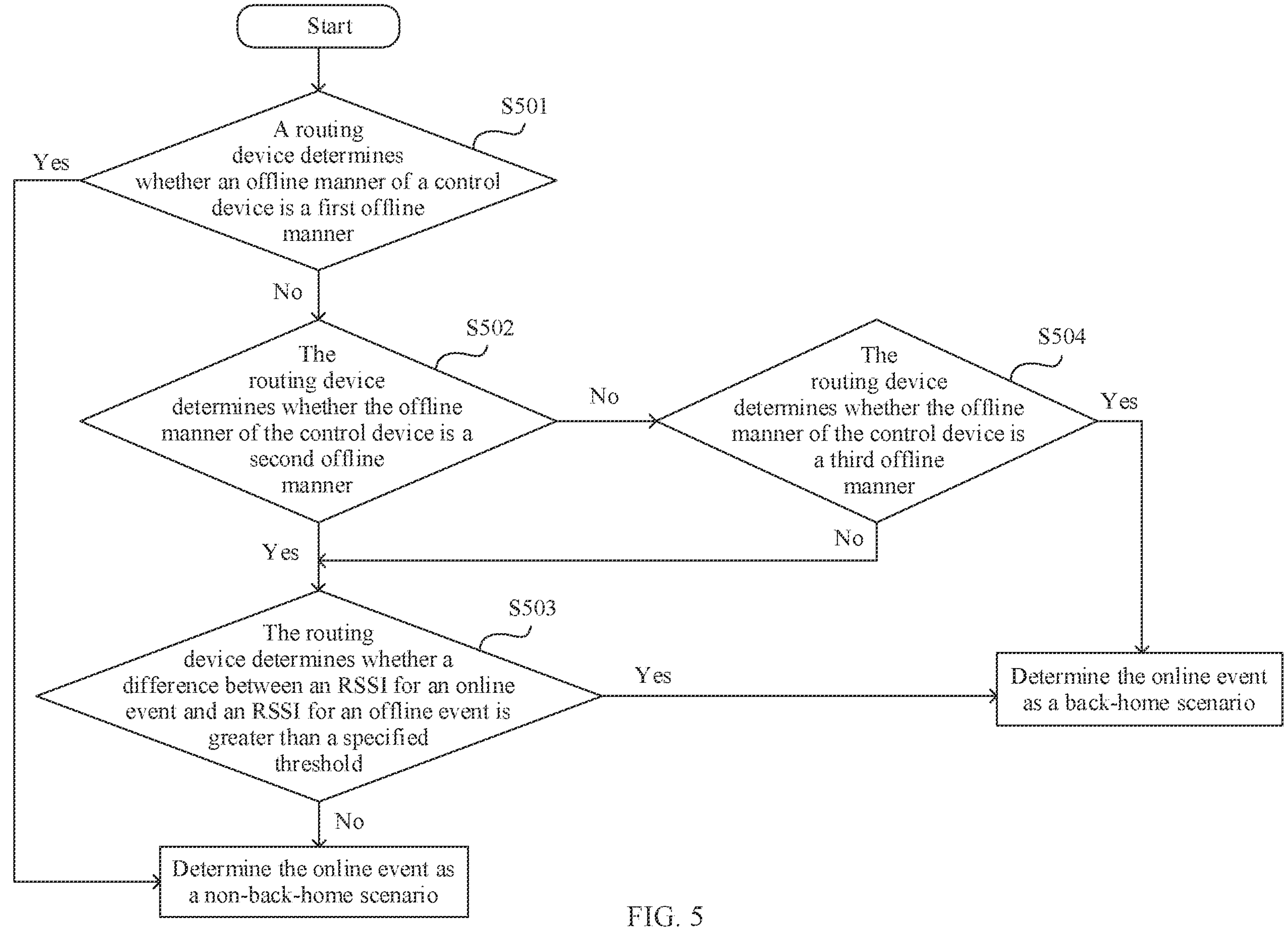
FIG. 5 is a flowchart of a method for recognizing a back-home scenario according to an embodiment of this application.

For example, FIG. 5 is a flowchart of a method for recognizing a back-home scenario according to an embodiment of this application. As shown in FIG. 5, the method may include the following steps.

S501: A routing device determines whether an offline manner of a control device is a first offline manner. If the offline manner of the control device is the first offline manner, it is determined that an online event is a non-back-home scenario. If the offline manner of the control device is not the first offline manner, proceed to S502.

S502: The routing device determines whether the offline manner of the control device is a second offline manner. If the offline manner of the control device is the second offline manner, proceed to S503. If the offline manner of the control device is not the second offline manner, proceed to S504.

S503: The routing device determines whether a difference between an RSSI for the online event and an RSSI for an offline event is greater than a specified threshold. If the difference is greater than the specified threshold, it is determined that the current online event is the back-home scenario. If the difference is less than the specified threshold, it is determined that the current online event is the non-back-home scenario.

The specified threshold is a value learned by the routing device within a set duration, for example, the specified threshold is 10 dB. Certainly, the specified threshold may be alternatively 15 dB, 20 dB, or the like. This is not limited in this application.

S504: The routing device determines whether the offline manner of the control device is a third offline manner. If the offline manner of the control device is the third offline manner, it is determined that the current online event is the back-home scenario. If the offline manner of the control device is not the third offline manner, perform S503.

That is, when the offline manner of the control device obtained by the routing device is the first offline manner, it may be determined that the online event is the non-back-home scenario. When the offline manner of the control device obtained by the routing device is the second offline manner or is not the third offline manner, it may be further determined, based on the difference between an RSSI for online and an RSSI for offline, whether the online event is the back-home scenario.

Alternatively, it may be understood that, in this embodiment of this application, if the offline manner of the control device obtained by the routing device is a manner of going offline because the router kicks off the device, it is determined that the current online event is the non-back-home scenario. Alternatively, if the offline manner of the control device obtained by the routing device is an aging offline manner, it is determined that the current online event is the back-home scenario. Alternatively, if the offline manner of the control device obtained by the routing device is an active offline manner, it is further determined whether the difference between an RSSI for online and an RSSI for offline is greater than the specified threshold. If the difference is greater than the specified threshold, it is determined that the online event is the back-home scenario; and if the difference is less than the specified threshold, it is determined that the online event is the non-back-home scenario.

Figure 6:
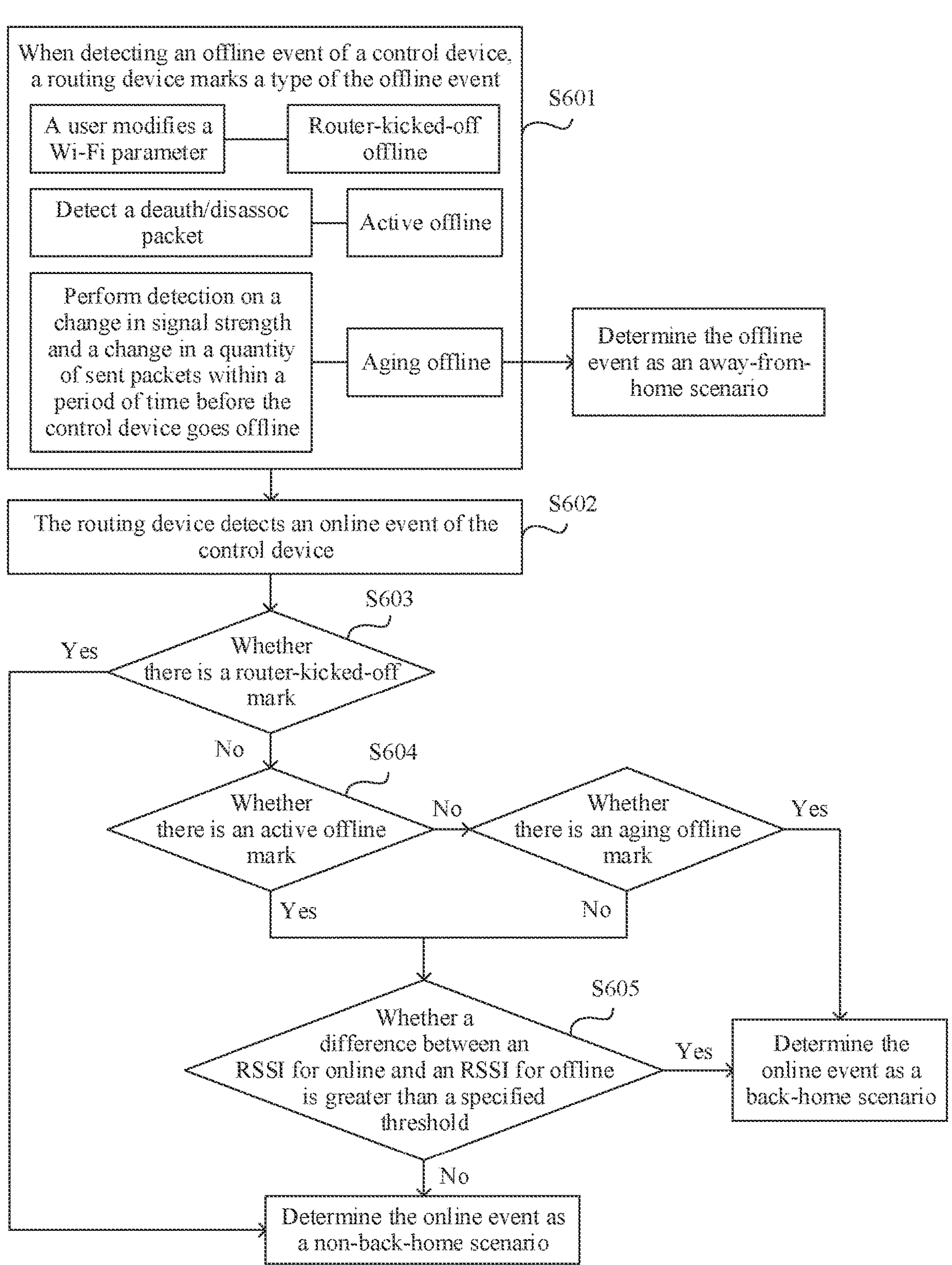
FIG. 6 is a flowchart of a method for recognizing an away-from-home or a back-home according to an embodiment of this application.

In the descriptions of the foregoing embodiments, the routing device may mark the offline manner of the control device. Therefore, when the control device goes online again, the routing device may determine, based on a mark, whether the online event is the back-home scenario. For example, FIG. 6 is a flowchart of a method for recognizing an away-from-home scenario or a back-home scenario according to an embodiment of this application. As shown in FIG. 6, the method includes the following steps.

S601: When detecting an offline event of a control device, a routing device marks a type of the offline event.

In this embodiment of this application, marking may be performed based on different offline manners, for example, several offline manners shown in the figure may be included. For the offline manner shown in the figure, refer to the descriptions in the foregoing embodiments. Details are not described herein again.

When the offline manner of the control device is an aging offline manner, it may be determined that the offline event of the control device is a scenario in which a user gets away from home.

S602: The routing device detects the online event of the control device.

S603: The routing device determines whether there is a router-kicked-off mark. If there is a router-kicked-off mark, the online event is a non-back-home scenario. If there is no router-kicked-off mark, proceed to S604.

S604: The routing device determines whether there is an active offline mark. If there is an active offline mark, proceed to S605. If there is no active offline mark, proceed to determine whether there is an aging offline mark. If there is no aging offline mark, proceed to S605. If there is an aging offline mark, the online event is determined as the back-home scenario.

In some embodiments, when the control device goes online, the routing device may determine whether an offline mark given by the routing device when the control device goes offline last time is the router-kicked-off mark, and then determine whether there is an active offline mark or an aging offline mark. In this way, a scenario for the online event can be quickly determined. Certainly, it may be first determined whether there is an active offline mark or an aging offline mark, and then it is determined whether there is a router-kicked-off mark or the like. A determining sequence of the foregoing marks or the foregoing offline manners is not specifically limited in this application.

S605: The routing device determines whether a difference between an RSSI for online and an RSSI for offline is greater than a specified threshold. If the difference is greater than the specified threshold, it is determined that the online event is a back-home scenario; or if the difference is less than the specified threshold, it is determined that the online event is a non-back-home scenario.

An actual application scenario is used as an example. It is assumed that a mobile phone of a user A is the control device. After the user A changes a password of the routing device, the mobile phone of the user A may break a Wi-Fi connection. In this case, the routing device may mark an offline manner of the mobile phone of the user A as router-kicked-off. After the user A re-enters the password to connect to Wi-Fi, the routing device may detect an online event of the mobile phone of the user A, and then find that a previous offline manner is router-kicked-off. In this case, it may be determined that the user does not get away from home, that is, the current online event is a non-back-home scenario.

If the user A prepares to take a lunch break, and places the mobile phone aside, after a period of time, the mobile phone may enter a screen-off and sleep state, to break the Wi-Fi connection. In this case, the routing device may mark the offline manner of the mobile phone of the user A as an active offline manner. When the user A plays the mobile phone after the lunch break, the mobile phone reconnects to Wi-Fi, and the routing device may detect an online event. In this case, a difference between an RSSI for online and an RSSI for offline of a mobile phone A may not be generally greater than the specified threshold. Therefore, the current online event is a non-back-home scenario.

If the user A gets away from home and goes downstairs, and the distance from the user A to the routing device becomes longer and longer, the routing device may mark the offline manner of the mobile phone of the user A as an aging offline manner. After the user gets back home and the mobile phone reconnects to Wi-Fi, the routing device may detect an online event. In this case, the routing device finds that a previous offline manner is an aging offline manner, and may determine that the current online event is a back-home scenario.

According to the method in this application, a scenario in which the user gets away from home or a scenario in which the user gets back home can be recognized without a need to install a smart door lock or a smart camera, to adjust a smart home to a corresponding away-from-home or back-home mode. In addition, the routing device recognizes the offline manner of the control device, and determines the scenario in which the user gets away from home or the scenario in which the user gets back home based on the offline manner of the control device. In this way, scenario recognition accuracy can be improved, and user experience can be improved.

In the foregoing embodiments provided in this application, the method provided in embodiments of this application is described from a perspective in which an electronic device serves as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether a function in the foregoing functions is performed by using the hardware structure, the software module, or both the hardware structure and the software module depends on particular applications and design constraints of the technical solutions.

Figure 7:
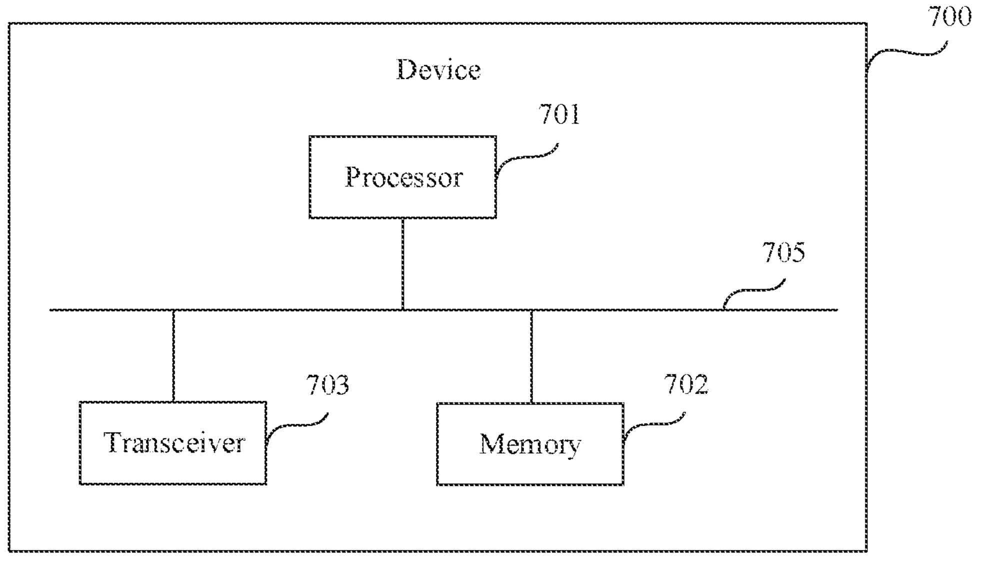
FIG. 7 is a schematic diagram of a structure of a device according to an embodiment of this application.

As shown in FIG. 7, some other embodiments of this application disclose a device. The device may be the routing device (for example, a router) or the electronic device in the foregoing embodiments. As shown in FIG. 7, a device 700 includes one or more processors 701, one or more memories 702, a transceiver 703, and one or more computer programs 704 (not shown in the figure). The foregoing components may be connected by using one or more communication buses 705.

The transceiver 703 may be configured to receive or send a packet or the like. The memory 702 stores one or more computer programs. The one or more computer programs include instructions. The processor 701 invokes the instructions stored in the memory 702, to enable the device 700 to perform the following steps:

when it is detected that a control device breaks a communication connection to the device, determining an offline manner of the control device, where the control device is one of a plurality of electronic devices, and the control device is a portable electronic device; recognizing, based on the offline manner of the control device, whether a scenario in which the control device breaks the communication connection is an away-from-home scenario; and when it is detected that the control device re-establishes the communication connection to the routing device, recognizing, based on the offline manner of the control device, whether a scenario in which the control device re-establishes the communication connection is a back-home scenario.

In a possible implementation, when the instructions are invoked and executed by the one or more processors, the device is enabled to perform the following step:

if a modification operation performed by a user on a wireless fidelity Wi-Fi parameter is detected, determining that the offline manner of the control device is a first offline manner; if a preset packet sent by the control device is received, determining that the offline manner of the control device is a second offline manner; if the preset packet sent by the control device is not received and/or the modification operation performed by the user on the wireless fidelity Wi-Fi parameter is not detected, determining that the offline manner of the control device is a third offline manner; or if it is determined that a change in signal strength and a change in a quantity of sent packets within a preset time before the control device breaks the communication connection to the routing device conform to a specified rule, determining that the offline manner of the control device is the third offline manner.

In a possible implementation, when the instructions are invoked and executed by the one or more processors, the device is enabled to perform the following step:

if it is determined that the offline manner of the control device is the first offline manner or the second offline manner, determining that the scenario in which the control device breaks the communication connection is a non-away-from-home scenario; or if it is determined that the offline manner of the control device is the third offline manner, determining that the scenario in which the control device breaks the communication connection is the away-from-home scenario.

In a possible implementation, when the instructions are invoked and executed by the one or more processors, the device is enabled to perform the following step:

if it is determined that the offline manner of the control device is the first offline manner, determining that the scenario in which the control device re-establishes the communication connection is a non-back-home scenario, if it is determined that the offline manner of the control device is the second offline manner, determining, based on a first received signal strength RSSI and a second RSSI, the scenario in which the control device re-establishes the communication connection, where the first RSSI is an RSSI obtained when the control device breaks the communication connection to the routing device, and the second RSSI is an RSSI obtained when the control device re-establishes the communication connection to the routing device; or if it is determined that the offline manner of the control device is the third offline manner, determining that the scenario in which the control device re-establishes the communication connection is the back-home scenario.

In a possible implementation, when the instructions are invoked and executed by the one or more processors, the device is enabled to perform the following step:

if it is determined that a difference between the first RSSI and the second RSSI is greater than a specified threshold, determining that the scenario in which the control device re-establishes the communication connection is the back-home scenario; or if it is determined that the difference between the first RSSI and the second RSSI is less than the specified threshold, determining that the scenario in which the control device re-establishes the communication connection is the non-back-home scenario.

In a possible implementation, the routing device includes a router.

In this embodiment of this application, the processor 701 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module. The software module may be located in the memory 702. The processor 701 reads the program instructions from the memory 702, and completes the steps of the foregoing method in combination with the hardware of the processor.

In this embodiment of this application, the memory 702 may be a non-volatile memory such as a hard disk drive (hard disk drive, HDD) or a solid-state drive (solid-state drive, SSD), or may be a volatile memory (volatile memory) such as a RAM. The memory may be alternatively any other medium that can be configured to carry or store expected program code in a form of an instruction structure or a data structure and that can be accessed by a computer. This is not limited thereto. The memory in this embodiment of this application may be alternatively a circuit or any other apparatus that can implement a storage function, and is configured to store instructions and/or data.

A person skilled in the art may clearly understand that, for the purpose of convenient and brief description, for a detailed working process of the foregoing apparatus and unit, refer to a corresponding process in the method embodiments. Details are not described herein again.

Based on the foregoing embodiments, this application further provides a computer storage medium. The computer storage medium stores a computer program, and when the computer program is executed by a computer, the computer is enabled to perform the method provided in the foregoing embodiments.

An embodiment of this application further provides a computer program product, including instructions. When the instructions are run on a computer, the computer is enabled to perform the method provided in the foregoing embodiments.

An embodiment of this application is described with reference to the flowcharts and/or block diagrams of the method, the device (system), and the computer program product according to embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be alternatively stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

What is claimed is:

1. A method comprising:

marking, when detecting at a routing device that a control device breaks a communication connection to the routing device, an offline manner of the control device;

recognizing, based on the offline manner, whether a first scenario of breaking the communication connection is an away-from-home scenario; and recognizing, based on the offline manner and when detecting that the control device re-establishes the communication connection to the routing device, whether a second scenario of re-establishing the communication connection is a back-home scenario.

2. The method according to claim 1, wherein marking the offline manner of the control device comprises:

marking, when detecting a modification operation of a user on a Wi-Fi parameter, that the offline manner is a first offline manner;

marking, when receiving a preset packet from the control device, that the offline manner is a second offline manner;

marking, when the preset packet is not received from the control device or when the modification operation is not detected, that the offline manner is a third offline manner; or marking, when a change in signal strength and a change in a quantity of received packets within a preset time, before the breaking of the communication connection, meet a specified rule, that the offline manner is the third offline manner.

3. The method according to claim 2, wherein recognizing whether the first scenario is the away-from-home scenario comprises recognizing, when the offline manner is the first offline manner or the second offline manner, that the first scenario is a non-away-from-home scenario.

4. The method according to claim 2, wherein recognizing whether the second scenario is the back-home scenario comprises:

recognizing, when the offline manner is the first offline manner, that the second scenario is a non-back-home scenario;

recognizing, when the offline manner is the second offline manner and based on a first received signal strength indication (RSSI) and a second RSSI, whether the second scenario is the back-home scenario or the non-back-home scenario; or recognizing, when the offline manner is the third offline manner, that the second scenario is the back-home scenario.

5. The method according to claim 2, wherein recognizing whether the second scenario is the back-home scenario comprises:

recognizing, when the offline manner is the first offline manner, that the second scenario is a non-back-home scenario; or recognizing, when the offline manner is the second offline manner and based on a first received signal strength indication (RSSI) and a second RSSI, whether the second scenario is the back-home scenario or the non-back-home scenario, wherein the first RSSI is based on detection of the breaking of the communication connection, and wherein the second RSSI is based on detection of the re-establishing of the communication connection.

6. The method according to claim 4, wherein recognizing, based on the first RSSI and the second RSSI, whether the second scenario is the back-home scenario or the non-back-home scenario comprises recognizing, when a difference between the first RSSI and the second RSSI is greater than a specified threshold, that the second scenario is the back-home scenario.

7. The method according to claim 4, further comprising:

obtaining the first RSSI when detecting the breaking of the communication connection; and obtaining the second RSSI when detecting the re-establishing of the communication connection.

8. A routing device comprising:

one or more memories configured to store instructions; and one or more processors coupled to the one or more memories and configured to execute the instructions to cause the routing device to:

mark, when detecting that a control device breaks a communication connection to the routing device, an offline manner of the control device;

recognize, based on the offline manner, whether a first scenario of breaking the communication connection is an away-from-home scenario; and recognize, based on the offline manner and when detecting that the control device re-establishes the communication connection to the routing device, whether a second scenario of re-establishing the communication connection is a back-home scenario.

9. The routing device according to claim 8, wherein the one or more processors are further configured to execute the instructions to cause the routing device to:

mark, when detecting a modification operation of a user on a Wi-Fi parameter, that the offline manner is a first offline manner;

mark, when receiving a preset packet from the control device, that the offline manner is a second offline manner;

mark, when the preset packet is not received from the control device or when the modification operation is not detected, that the offline manner is a third offline manner; or mark, when a change in signal strength and a change in a quantity of received packets within a preset time, before the breaking of the communication connection, meet a specified rule, that the offline manner is the third offline manner.

10. The routing device according to claim 9, wherein the one or more processors are further configured to execute the instructions to cause the routing device to recognize, when the offline manner is the third offline manner, that the first scenario is the away-from-home scenario.

11. The routing device according to claim 9, wherein the one or more processors are further configured to execute the instructions to cause the routing device to:

recognize, when the offline manner is the first offline manner, that the second scenario is a non-back-home scenario;

recognize, when the offline manner is the second offline manner and based on a first received signal strength indication (RSSI) and a second RSSI, whether the second scenario is the back-home scenario or the non-back-home scenario, wherein the first RSSI is based on detection of the breaking of the communication connection, and wherein the second RSSI is based on detection of the re-establishing of the communication connection; or recognize, when the offline manner is the third offline manner, that the second scenario is the back-home scenario.

12. The routing device according to claim 9, wherein the one or more processors are further configured to execute the instructions to cause the routing device to recognize, when the offline manner is the third offline manner, that the second scenario is the back-home scenario.

13. The routing device according to claim 11, wherein the one or more processors are further configured to execute the instructions to cause the routing device to recognize, when a difference is less than a specified threshold, that the second scenario is the non-back-home scenario.

14. The routing device according to claim 8, wherein the routing device comprises a router.

15. The routing device according to claim 8, wherein the control device is a portable electronic device.

16. A non-transitory computer-readable storage medium storing computer-executable instructions that, when executed by at least one processor, cause a routing device to:

mark, when detecting that a control device breaks a communication connection to the routing device, an offline manner of the control device;

recognize, based on the offline manner, whether a first scenario of breaking the communication connection is an away-from-home scenario; and recognize, based on the offline manner and when detecting that the control device re-establishes the communication connection to the routing device, whether a second scenario of re-establishing the communication connection is a back-home scenario.

17. The non-transitory computer-readable storage medium according to claim 16, wherein the computer-executable instructions, when executed by the at least one processor, cause the routing device to mark the offline manner by:

marking, when detecting a modification operation of a user on a Wi-Fi parameter, that the offline manner is a first offline manner;

marking, when receiving a preset packet from the control device, that the offline manner is a second offline manner;

marking, when the preset packet is not received from the control device or when the modification operation is not detected, that the offline manner is a third offline manner; or marking, when a change in signal strength and a change in a quantity of received packets within a preset time, before the breaking of the communication connection, meet a specified rule, that the offline manner is the third offline manner.

18. The non-transitory computer-readable storage medium according to claim 17, wherein the computer-executable instructions, when executed by the at least one processor, cause the routing device to recognize whether the first scenario is the away-from-home scenario by:

recognizing, when the offline manner is the first offline manner or the second offline manner, that the first scenario is a non-away-from-home scenario; or recognizing, when the offline manner is the third offline manner, that the first scenario is the away-from-home scenario.

19. The non-transitory computer-readable storage medium according to claim 17, wherein the computer-executable instructions, when executed by the at least one processor, cause the routing device to recognize whether the second scenario is the back-home scenario by:

recognizing, when the offline manner is the first offline manner, that the second scenario is a non-back-home scenario;

recognizing, when the offline manner is the second offline manner and based on a first received signal strength indication (RSSI) and a second RSSI, whether the second scenario is the back-home scenario or the non-back-home scenario, wherein the first RSSI is based on detection of the breaking of the communication connection, and wherein the second RSSI is based on detection of the re-establishing of the communication connection; or recognizing, when the offline manner is the third offline manner, that the second scenario is the back-home scenario.

20. The non-transitory computer-readable storage medium according to claim 19, wherein the computer-executable instructions, when executed by the at least one processor, cause the routing device to recognize, based on the first RSSI and the second RSSI, whether the second scenario is the back-home scenario or the non-back-home scenario by:

recognizing, when a difference between the first RSSI and the second RSSI is greater than a specified threshold, that the second scenario is the back-home scenario; or recognizing, when the difference is less than the specified threshold, that the second scenario is the non-back-home scenario.

* * * * *